Patented July 2, 1929.

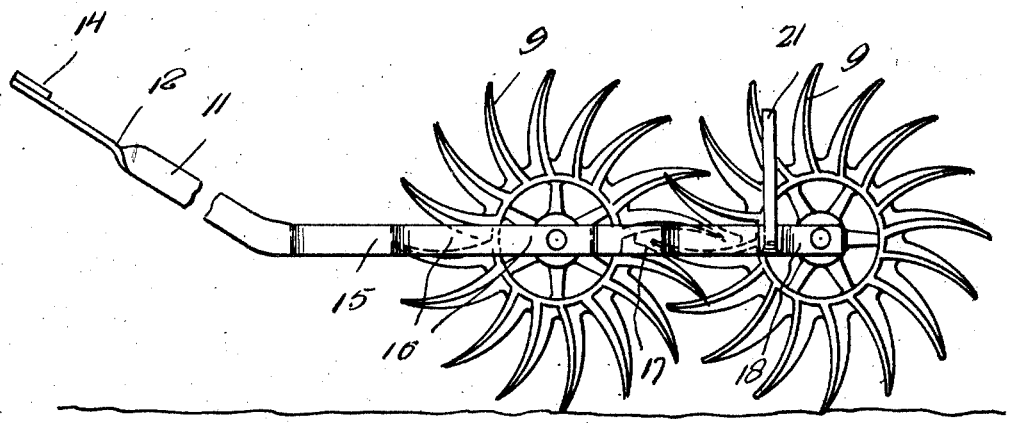
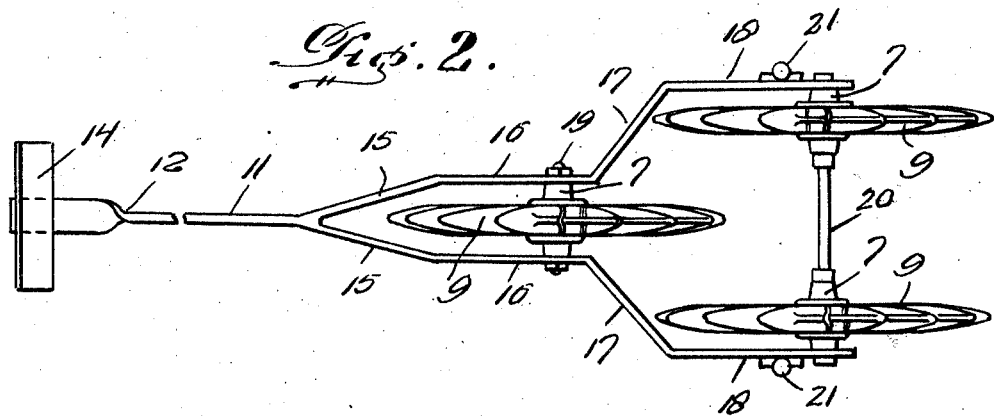

1,719,292

UNITED STATES PATENT OFFICE.

JOHN A. FULK AND LEWIS J. McCORMICK, OF BLUFFTON, INDIANA.

ROTARY HOE ATTACHMENT FOR CORN CULTIVATORS.

Application filed June 26, 1928. Serial No. 288,506.

The present invention relates to a rotary hoe attachment for a corn cultivator, and the object and advantages thereof will become apparent as the description proceeds.

In the drawing:

Figure 1 is a side elevation of my invention.

Figure 2 is a top plan view thereof.

Referring now particularly to the embodiment shown in Figures 1 and 2, it will be seen that the numeral 11 denotes an upwardly and forwardly inclined shank, twisted intermediate its ends, as at 12, and having a cross member 14, at its upper end. The lower end of the shank 11 merges into a frame structure comprising rearwardly diverging portions 15, merging into spaced parallel coextensive portions 16, which in turn merge into rearwardly diverging portions 17, which in turn merge into rearwardly directed spaced parallel co-extensive portions 18. Spindles 19 are located between the rear parts of portions 16 and receive the hubs 7, of the rotary hoe, such as described in connection with the previous embodiment. A spindle 20 extends between the rear ends of the portions 18 and has a pair of rotary hoes thereon, one adjacent each portion 18. This arrangement or embodiment of the attachment is designed for a single row plow and the shank or beam 11 is to be attached to the tongue of the cultivator and the lower portion of the attachment is to be merged into the frame structure described having the three separate hoes rotatable therein. The frame itself is of substantially V shaped construction and in the fore part has the single hoe which runs over the row of corn itself and to the rear of the frame is attached the two rotary hoes which are intended to operate on either side of the row. To the rear of the frame are attached iron projections which extend upwardly as indicated at 21, and are to be clamped to the plow shanks on either side and to hold the same firmly.

It is thought that the construction, utility and advantages of this invention will now be quite apparent to those skilled in this art, without a more detailed description thereof. The present embodiments of the invention have been disclosed in detail, merely by way of example, since in actual practice, they attain the features of advantages enumerated as desirable in the statement of the invention and the above description.

It will be apparent that changes in the details of construction, and in the combination and arrangement of parts may be resorted to, without departing from the spirit or scope of the invention as hereinafter claimed or sacrificing any of its advantages.

Having thus described our invention, what we claim as new is:

1. An attachment of the class described, including a substantially V-shaped horizontal frame, a shank merging at the apex of the frame and inclining upwardly and forwardly with respect thereto, a spindle across the forward portion of the frame, a spindle across the rear portion of the frame, a single rotary hoe on the first spindle, a pair of rotary hoes on the rear spindle adjacent the ends thereof.

2. An attachment of the class described, including a substantially V-shaped horizontal frame, a shank merging at the apex of the frame and inclining upwardly and forwardly with respect thereto, a spindle across the forward portion of the frame, a spindle across the rear portion of the frame, a single rotary hoe on the first spindle, a pair of rotary hoes on the rear spindle adjacent the ends thereof, said substantially V-shaped frame including rearwardly diverging portions adjacent the apex thereof merging into rearwardly directed straight portions disposed in co-extensive spaced parallelism and merging into rearwardly diverging portions which in turn merge into rearwardly extending straight co-extensive parallel spaced portions.

3. An attachment of the class described, including a substantially V-shaped horizontal frame, a shank merging at the apex of the frame and inclining upwardly and forwardly with respect thereto, a spindle across the forward portion of the frame, a spindle across the rear portion of the frame, a single rotary hoe on the first spindle, a pair of rotary hoes on the rear spindle adjacent the ends thereof, said substantially V-shaped frame including rearwardly diverging portions adjacent the apex thereof merging into rearwardly directed straight portions disposed in co-extensive spaced parallelism and merging into rearwardly diverging portions which in turn merge into rearwardly extending straight co-extensive parallel spaced portions, the front spindles being located between the first mentioned straight portions, and the rear spindles between the last mentioned straight portions.

4. An attachment of the character described including a frame comprising a substantially V-shaped horizontal frame having the sides thereof extending in the same plane, a shank merging with the apex of the frame and inclining upwardly and forwardly with respect to the frame, said shank being twisted 180 degrees intermediate its ends, a pair of spindles disposed horizontally and secured to the frame and the one spindle being disposed nearer the apex of the frame and of less width than the other, a rotary hoe mounted on the forward spindle and a pair of rotary hoes mounted on the other spindle in spaced relation to each other and their plane of rotation spaced from the opposite sides of the forward rotary hoe and the diameter of the forward rotary hoe overlying the diameter of the rearward rotary hoes.

In testimony whereof we affix our signatures.

JOHN A. FULK.
LEWIS J. McCORMICK.